US009838961B2

(12) United States Patent
Kenney et al.

(10) Patent No.: US 9,838,961 B2
(45) Date of Patent: Dec. 5, 2017

(54) COMMUNICATION STATION AND METHOD FOR COMMUNICATING USING MINIMUM BANDWIDTH UNITS OF VARIOUS TONE ALLOCATIONS FOR OFDMA HEW

(71) Applicant: Intel IP Corporation, Santa Clara, CA (US)

(72) Inventors: Thomas J. Kenney, Portland, OR (US); Eldad Perahia, Portland, OR (US); Shahrnaz Azizi, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/023,581

(22) PCT Filed: Sep. 22, 2014

(86) PCT No.: PCT/US2014/056819
§ 371 (c)(1),
(2) Date: Mar. 21, 2016

(87) PCT Pub. No.: WO2015/076923
PCT Pub. Date: May 28, 2015

(65) Prior Publication Data
US 2016/0211944 A1    Jul. 21, 2016

Related U.S. Application Data

(60) Provisional application No. 61/906,059, filed on Nov. 19, 2013, provisional application No. 61/973,376, (Continued)

(51) Int. Cl.
*H04K 1/10* (2006.01)
*H04J 11/00* (2006.01)
(Continued)

(52) U.S. Cl.
CPC ...... *H04W 52/0206* (2013.01); *H04B 7/0413* (2013.01); *H04B 7/2615* (2013.01);
(Continued)

(58) Field of Classification Search
CPC . H04B 5/0018; H04L 12/4641; H04L 5/0094; H04L 27/2601; H04L 69/22;
(Continued)

(56) References Cited

U.S. PATENT DOCUMENTS 7,466,964 B2 * 12/2008 Sondur .................. H04L 1/1614
455/101
7,809,020 B2   10/2010 Douglas et al.
(Continued)

FOREIGN PATENT DOCUMENTS

CN    101433018 A    5/2009
CN    103703711 A    4/2014
(Continued)

OTHER PUBLICATIONS

"U.S. Appl. No. 14/315,562, Examiner Interview Summary dated Jun. 20, 2016", 2 pgs.
(Continued)

*Primary Examiner* — Daniel Washburn
*Assistant Examiner* — Sarah Hassan
(74) *Attorney, Agent, or Firm* — Schwegman Lundberg & Woessner, P.A.

(57) ABSTRACT

Embodiments of a communication station and method for communicating in a wireless network are generally described herein. In some embodiments, the communication station may be configured to communicate orthogonal frequency division multiplexed (OFDM) symbols on channel resources in accordance with an orthogonal frequency division multiple access (OFDMA) technique during a control period. The channel resources may comprise one or more
(Continued)

200 minimum bandwidth units. Each minimum bandwidth unit may have a predetermined bandwidth and may be configured in accordance with one of a plurality of subcarrier allocations for one of a plurality of interleaver configurations.

22 Claims, 3 Drawing Sheets

Related U.S. Application Data filed on Apr. 1, 2014, provisional application No. 61/976,951, filed on Apr. 8, 2014, provisional application No. 61/986,256, filed on Apr. 3, 2014, provisional application No. 61/986,250, filed on Apr. 30, 2014, provisional application No. 61/991,730, filed on May 12, 2014, provisional application No. 62/013,869, filed on Jun. 18, 2014, provisional application No. 62/024,801, filed on Jul. 15, 2014.

(51) Int. Cl.

| | | |
|---|---|---|
| H04W 52/02 | (2009.01) | |
| H04L 27/26 | (2006.01) | |
| H04L 5/00 | (2006.01) | |
| H04W 74/04 | (2009.01) | |
| H04W 52/24 | (2009.01) | |
| H04W 72/04 | (2009.01) | |
| H04W 74/02 | (2009.01) | |
| H04L 1/00 | (2006.01) | |
| H04L 27/34 | (2006.01) | |
| H04B 7/0413 | (2017.01) | |
| H04B 7/26 | (2006.01) | |
| H04W 84/12 | (2009.01) | |
| H04W 74/08 | (2009.01) | |
| H04W 88/10 | (2009.01) | |
| H04W 88/08 | (2009.01) | |

(52) U.S. Cl.
CPC ............ *H04L 1/0071* (2013.01); *H04L 5/001* (2013.01); *H04L 5/003* (2013.01); *H04L 5/0007* (2013.01); *H04L 5/0035* (2013.01); *H04L 5/0037* (2013.01); *H04L 5/0048* (2013.01); *H04L 5/0094* (2013.01); *H04L 27/261* (2013.01); *H04L 27/2602* (2013.01); *H04L 27/3405* (2013.01); *H04L 27/3483* (2013.01); *H04W 52/244* (2013.01); *H04W 72/042* (2013.01); *H04W 72/0406* (2013.01); *H04W 72/0426* (2013.01); *H04W 72/0453* (2013.01); *H04W 72/0473* (2013.01); *H04W 74/02* (2013.01); *H04W 74/04* (2013.01); *H04W 74/08* (2013.01); *H04L 5/0098* (2013.01); *H04W 74/0808* (2013.01); *H04W 84/12* (2013.01); *H04W 88/08* (2013.01); *H04W 88/10* (2013.01); *Y02B 60/50* (2013.01)

(58) Field of Classification Search
CPC ........... H04L 27/0006; H04L 25/03343; H04L 27/18; H04L 5/005; H04L 1/00; H04L 1/0071; H04L 27/2649; H04L 1/1887; H04L 27/2627; H04L 5/006; H04L 27/04; H04W 12/06; H04W 84/005; H04W 84/12
USPC ........ 375/260, 340, 262, 265, 267; 370/208, 370/210
See application file for complete search history.

(56) References Cited

U.S. PATENT DOCUMENTS

| | | |
|---|---|---|
| 8,560,009 B2 | 10/2013 | Etemad |
| 9,271,241 B2 | 2/2016 | Kenney et al. |
| 9,325,463 B2 | 4/2016 | Azizi et al. |
| 9,450,725 B2 | 9/2016 | Azizi et al. |
| 9,462,504 B2 | 10/2016 | Stephens et al. |
| 9,544,914 B2 | 1/2017 | Azizi et al. |
| 9,615,291 B2 | 4/2017 | Kenney et al. |
| 9,648,620 B2 | 5/2017 | Tandra et al. |
| 2004/0054820 A1* | 3/2004 | Karaoguz ............ G01S 5/0252 710/8 |
| 2004/0146117 A1 | 7/2004 | Subramaniam et al. |
| 2005/0015703 A1* | 1/2005 | Terry .................... H04L 1/1685 714/776 |
| 2005/0063336 A1* | 3/2005 | Kim ...................... H04L 1/0025 370/329 |
| 2006/0030322 A1 | 2/2006 | Kim et al. |
| 2006/0067415 A1 | 3/2006 | Mujtaba |
| 2006/0105764 A1* | 5/2006 | Krishnaswamy ....... H04L 45/22 455/424 |
| 2007/0014375 A1 | 1/2007 | Nakao |
| 2007/0042715 A1* | 2/2007 | Salo ..................... H04B 1/1027 455/63.4 |
| 2007/0060161 A1 | 3/2007 | Chindapol et al. |
| 2007/0202816 A1 | 8/2007 | Zheng |
| 2007/0242600 A1 | 10/2007 | Li et al. |
| 2008/0049851 A1 | 2/2008 | Nangia et al. |
| 2008/0188232 A1 | 8/2008 | Park et al. |
| 2008/0240275 A1 | 10/2008 | Cai |
| 2009/0007185 A1* | 1/2009 | Nix ........................ H04B 7/10 725/62 |
| 2009/0310692 A1 | 12/2009 | Kafle et al. |
| 2010/0080312 A1 | 4/2010 | Moffatt et al. |
| 2010/0098181 A1* | 4/2010 | Jacobsen ............. H04B 7/0408 375/260 |
| 2010/0246375 A1 | 9/2010 | Orlik et al. |
| 2010/0260159 A1 | 10/2010 | Zhang et al. |
| 2010/0309834 A1 | 12/2010 | Fischer et al. |
| 2011/0026623 A1* | 2/2011 | Srinivasa ............. H04L 1/0016 375/260 |
| 2011/0038441 A1 | 2/2011 | Shi |
| 2011/0075625 A1 | 3/2011 | Nyström et al. |
| 2011/0110454 A1 | 5/2011 | Sampath et al. |
| 2011/0149882 A1 | 6/2011 | Gong et al. |
| 2011/0194544 A1 | 8/2011 | Yang et al. |
| 2011/0222486 A1 | 9/2011 | Hart |
| 2011/0268094 A1 | 11/2011 | Gong et al. |
| 2011/0305296 A1 | 12/2011 | Van Nee |
| 2012/0063433 A1 | 3/2012 | Wentink |
| 2012/0127940 A1 | 5/2012 | Lee et al. |
| 2012/0155444 A1 | 6/2012 | Chiueh et al. |
| 2012/0170563 A1 | 7/2012 | Abraham et al. |
| 2012/0201213 A1 | 8/2012 | Banerjea et al. |
| 2012/0243485 A1 | 9/2012 | Merlin et al. |
| 2012/0314786 A1* | 12/2012 | Atungsiri ............ H04L 27/3488 375/260 |
| 2012/0327870 A1 | 12/2012 | Grandhi et al. |
| 2013/0136075 A1 | 5/2013 | Yu et al. |
| 2013/0177090 A1 | 7/2013 | Yang et al. |
| 2013/0188572 A1 | 7/2013 | Cheong et al. |
| 2013/0250940 A1 | 9/2013 | Parlamas et al. |
| 2013/0265907 A1 | 10/2013 | Kim et al. |
| 2013/0286925 A1 | 10/2013 | Fischer et al. |
| 2013/0286959 A1 | 10/2013 | Lou et al. |
| 2014/0169245 A1 | 6/2014 | Kenney et al. |
| 2014/0169356 A1 | 6/2014 | Noh et al. |
| 2014/0269544 A1 | 9/2014 | Zhu et al. |
| 2014/0307650 A1 | 10/2014 | Vermani et al. |
| 2015/0023335 A1 | 1/2015 | Vermani et al. |
| 2015/0085836 A1 | 3/2015 | Kang et al. |
| 2015/0124745 A1 | 5/2015 | Tandra et al. |
| 2015/0131756 A1 | 5/2015 | Suh et al. |
| 2015/0207599 A1 | 7/2015 | Kim et al. |
| 2015/0237531 A1 | 8/2015 | Hao et al. |
| 2016/0112899 A1 | 4/2016 | Kenney et al. |

(56) References Cited

U.S. PATENT DOCUMENTS

| | | | |
|---|---|---|---|
| 2016/0211961 | A1 | 7/2016 | Azizi et al. |
| 2017/0019916 | A1 | 1/2017 | Azizi et al. |
| 2017/0111154 | A1 | 4/2017 | Azizi et al. |
| 2017/0135035 | A1 | 5/2017 | Azizi et al. |

FOREIGN PATENT DOCUMENTS

| | | | |
|---|---|---|---|
| CN | 105637968 | A | 6/2016 |
| CN | 105659656 | A | 6/2016 |
| CN | 105706407 | A | 6/2016 |
| CN | 105900511 | A | 8/2016 |
| CN | 106100807 | A | 11/2016 |
| EP | 2499872 | A1 | 9/2012 |
| EP | 3072270 | A1 | 9/2016 |
| EP | 3072324 | A1 | 9/2016 |
| EP | 3072345 | A1 | 9/2016 |
| EP | 3072347 | A1 | 9/2016 |
| TW | 200539601 | A | 12/2005 |
| TW | 201044815 | A | 12/2010 |
| TW | 201141288 | A | 11/2011 |
| TW | 201234880 | A | 8/2012 |
| TW | 201322786 | A | 6/2013 |
| TW | 201349815 | A | 12/2013 |
| TW | 201406107 | A | 2/2014 |
| TW | 201605191 | A | 2/2016 |
| TW | 201608863 | A | 3/2016 |
| TW | 201622458 | A | 6/2016 |
| TW | 201632022 | A | 9/2016 |
| TW | I572173 | B | 2/2017 |
| TW | I573413 | B | 3/2017 |
| TW | I578837 | B | 4/2017 |
| TW | I578838 | B | 4/2017 |
| WO | WO-2008118429 | A1 | 10/2008 |
| WO | WO-2015077040 | A8 | 5/2015 |

OTHER PUBLICATIONS

"U.S. Appl. No. 14/315,562, Final Office Action dated Mar. 21, 2016", 16 pgs.
"U.S. Appl. No. 14/315,562, Notice of Allowability dated Jun. 20, 2016", 7 pgs.
"U.S. Appl. No. 14/315,562, Notice of Allowance dated Jun. 6, 2016", 12 pgs.
"U.S. Appl. No. 14/315,562, Response filed May 16, 2016 to Final Office Action dated Mar. 21, 2016", 10 pgs.
"U.S. Appl. No. 14/447,254, Non Final Office Action dated Mar. 31, 2016", 13 pgs.
"U.S. Appl. No. 14/458,000, Final Office Action dated Jul. 25, 2016", 11 pgs.
"U.S. Appl. No. 14/977,405, Examiner Interview Summary dated Jul. 25, 2016", 3 pgs.
"U.S. Appl. No. 14/977,405, Response filed Jul. 20, 2016 to Non Final Office Action dated Feb. 2, 2016", 11 pgs.
"U.S. Appl. No. 15/052,600, Corrected Notice of Allowance dated Jun. 24, 2016", 7 pgs.
"U.S. Appl. No. 15/052,600, Notice of Allowance dated May 20, 2016", 10 pgs.
"U.S. Appl. No. 15/052,600, Preliminary Amendment dated Apr. 1, 2016", 10 pgs.
"International Application Serial No. PCT/US2014/056819, International Preliminary Report on Patentability dated Jun. 2, 2016", 8 pgs.
"International Application Serial No. PCT/US2014/064340, International Preliminary Report on Patentability dated Jun. 2, 2016", 8 pgs.
"International Application Serial No. PCT/US2014/064350, International Preliminary Report on Patentability dated Jun. 2, 2016", 7 pgs.
"International Application Serial No. PCT/US2014/064509, International Preliminary Report on Patentability dated Jun. 2, 2016" 10 pgs.
"International Application Serial No. PCT/US2014/064599, International Preliminary Report on Patentability dated Jun. 2, 2016", 9 pgs.
"International Application Serial No. PCT/US2014/064767, International Preliminary Report on Patentability dated Jun. 2, 2016", 10 pgs.
"Taiwanese Application Serial No. 104106272, Office Action dated Apr. 18, 2016", w/ English Claims, 15 pgs.
"Taiwanese Application Serial No. 104106275, Office Action dated Jun. 8, 2016", 3 pgs.
"Taiwanese Application Serial No. 104108807, Office Action dated May 26, 2016", W/ English Search Report, 10 pgs.
"Taiwanese Application Serial No. 104110914, Office Action dated Mar. 28, 2016", w/ English Claims, 14 pgs.
Choi, Jinsoo, "Discussion on OFDMA in HEW", in: IEEE P802.11—High Efficiency WLAN Study Group, (Nov. 11, 2013), 11 pgs.
U.S. Appl. No. 15/477,542, filed Apr. 3, 2017, Access Point and Methods for Distinguishing HEW Physical Layer Packets With Backwards Compatibility.
11ah Preamble for 2Mhz and Beyond, IEEE Submission No. IEEE 802.1-11/1483r2, 1-24.
"U.S. Appl. No. 14/341,055, Non Final Office Action dated Nov. 14, 2016", 10 pgs.
"U.S. Appl. No. 14/447,254, Examiner Interview Summary dated Jul. 22, 2016", 4 pgs.
"U.S. Appl. No. 14/447,254, Final Office Action dated Sep. 14, 2016", 13 pgs.
"U.S. Appl. No. 14/447,254, Response filed Aug. 1, 2016 to Non Final Office Action dated Mar. 31, 2016", 12 pgs.
"U.S. Appl. No. 14/458,000, Notice of Allowance dated Aug. 24, 2016", 11 pgs.
"U.S. Appl. No. 14/458,000, Response filed Aug. 8, 2016 to Final Office Action dated May 9, 2016", 12 pgs.
"U.S. Appl. No. 14/977,405, Final Office Action dated Aug. 24, 2016", 8 pgs.
"U.S. Appl. No. 14/977,405, Notice of Allowance dated Nov. 18, 2016", 8 pgs.
"U.S. Appl. No. 14/977,405, Response filed Oct. 24, 2016 to Final Office Action dated Aug. 24, 2016", 11 pgs.
"U.S. Appl. No. 15/052,600, Corrected Notice of Allowance dated Aug. 5, 2016", 7 pgs.
"European Application Serial No. 14863362.1, Response filed Dec. 20, 2016 to Communication pursuant to Rules 161(2) and 162 EPC dated Jun. 28, 2016", 21 pgs.
"European Application Serial No. 16168650.6, Extended European Search Report dated Sep. 7, 2016", 12 pgs.
"Indian Application Serial No. 201647013626, Voluntary Amendment dated Aug. 4, 2016", W/ English Translation, 15 pgs.
"Indian Application Serial No. 201647013653, Preliminary Amendment dated Aug. 8, 2016", W/ English Translation, 18 pgs.
"Taiwanese Application Serial No. 104106272, Response filed Oct. 14, 2016 to Office Action dated Apr. 18, 2016", W/ English Claims, 45 pgs.
"Taiwanese Application Serial No. 104106275, Response filed Sep. 6, 2016 to Office Action dated Jun. 8, 2016", W/ English Claims, 80 pgs.
"Taiwanese Application Serial No. 104108807, Response filed Nov. 25, 2016 Office Action dated May 26, 2016", W/ English Claims, 65 pgs.
"Taiwanese Application Serial No. 104110914, Response filed Sep. 10, 2016 to Office Action dated Mar. 28, 2016", W/ English Translation of Claims, 98 pgs.
"Taiwanese Application Serial No. 104118504, Office Action dated Jul. 21, 2016", W/ English Search Report, 12 pgs.
"Taiwanese Application Serial No. 104118504, Response filed Oct. 18, 2016 to Office Action dated Jul. 21, 2016", W/ English Claims, 104 pgs.
"Taiwanese Application Serial No. 104122567, Office Action dated Oct. 13, 2016", W/ English Search Report, 8 pgs.
"Taiwanese Application Serial No. 105113980, Office Action dated Jul. 21, 2016", W/ English Claims, 18 pgs.

(56) References Cited

OTHER PUBLICATIONS

"Taiwanese Application Serial No. 105113980, Response filed Oct. 24, 2016 to Office Action dated Jul. 21, 2016", W/ English Claims, 80 pgs.
Chun, Jinyoung, et al., "Legacy Support on HEW frame structure", IEEE 11-13/1057r0, (Sep. 1, 2013), 8 pgs.
U.S. Appl. No. 15/052,600, filed Feb. 24, 2016, Wireless Apparatus for High-Efficiency (HE) Communication With Additional Subcarriers.
U.S. Appl. No. 14/447,254, filed Jul. 30, 2014, Master Station and Method for High-Feficiency Wi-Fi (HEW) Communication With a Minimum OFDMA Bandwidth Unit.
U.S. Appl. No. 14/315,562, filed Jun. 26, 2014, Transmit Time Offset In Uplink Multi-User Multiple Input-Multiple Output System.
U.S. Appl. No. 14/977,405, filed Dec. 21, 2015, High-Efficiency Station (STA) and Method for Decoding an HE-PPDU (as Amended).
U.S. Appl. No. 14/341,055, filed Jul. 25, 2014, HEW Master Station and Method for Communicating in Accordance With a Scheduled OFDMA Technique on Secondary Channels.
U.S. Appl. No. 14/458,000, filed Aug. 12, 2014, Master Station and Method for HEW Communication Using a Transmission Signaling Structure for a HEW Signal Field.
"U.S. Appl. No. 14/447,254, Advisory Action dated Feb. 13, 2017", 4 pgs.
"U.S. Appl. No. 14/447,254, Examiner Interview Summary dated Jan. 18, 2017", 3 pgs.
"U.S. Appl. No. 14/447,254, Response filed Jan. 17, 2017 Final Office Action dated Sep. 14, 2016", 11 pgs.
"U.S. Appl. No. 15/263,864, Non Final Office Action dated Mar. 10, 2017", 4 pgs.
"U.S. Appl. No. 14/341,055, Examiner Interview Summary dated Apr. 18, 2017", 3 pgs.
"U.S. Appl. No. 14/341,055, Response filed Apr. 14, 2017 to Non Final Office Action dated Nov. 14, 2016", 11 pgs.
"U.S. Appl. No. 15/263,864, Response filed Jun. 9, 2017 to Non Final Office Action dated Mar. 10, 2017", 9 pgs.
"U.S. Appl. No. 15/280,782, Non Final Office Action dated May 12, 2017", 25 pgs.
"U.S. Appl. No. 15/394,069, Non Final Office Action dated May 26, 2017", 18 pgs.
"European Application Serial No. 14863142.7, Extended European Search Report dated May 3, 2017", 7 pgs.
"Taiwanese Application Serial No. 104118345, Office Action dated May 10, 2017", W/ English Translation, 9 pgs.
"Taiwanese Application Serial No. 104118504, Office Action dated Apr. 21, 2017", W/English Claims, 19 pgs.
"Taiwanese Application Serial No. 104122567, Response Filed Apr. 13, 2017 to Office Action dated Oct. 13, 2016", (W/O English Claims), 9 pgs.
"European Application Serial No. 14863362.1, Extended European Search Report dated Jul. 18, 2017", 8 pgs.
"European Application Serial No. 14864107.9, Extended European Search Report dated Jul. 27, 2017", 13 pgs.
"European Application Serial No. 14864636.7, Extended European Search Report dated Jul. 21, 2017", 8 pgs.
"European Application Serial No. 16168650.6, Communication Pursuant to Article 94(3) EPC dated Aug. 2, 2017", 5 pgs.
"Taiwanese Application Serial No. 104118504, Response Filed Jul. 20, 2017 to Office Action dated Apr. 21, 2017", without English Translation, 8 pgs.
"Taiwanese Application Serial No. 104122567, Office Action dated Jun. 27, 2017", (W/ Partial English Translation), 5 pgs.
Dave, Hedberg, et al., "Adjacent Channel Interference and Filtering for 56-carrier Signals;11 -04-1579-01 -000n-11 -04-1579-00-000n-aci-results", (Jan. 17, 2005), 1-26 pgs.
Jinyoung, Chun, et al., "Legacy Support on HEW frame structure", IEEE Draft; 11-13-1057-00-OHEW-Legacy-Support-On-HEW-Frame-Structure, IEEE-SA Mentor, Piscataway NJ USA, vol. 802.11 HEW, (Sep. 16, 2013), 1-8.
Koskela, Timo, et al., "Discussion on Potential Techniques for HEW", in: IEEE P802.11 High Efficiency WLAN Study Group, [Online] Retrieved from the Internet: <http://www.ieee802.org/11/Reports/hew_update.html>, Jul. 15, 2013), 13 pgs.
Raja, Banerjea, "A simplified STR Mechansim—MAC 11-14-0340-00-0hew-a-simplified-str-mechansim mac", IEEE Draft, 11-14-0340-00-oHEW-A-Simplified-STR-Mechan SIM-MAC, IEEE-Samentor, Piscataway, NJ usa,vol. 802.11HEW, (Mar. 16, 2014), 13 pgs.
Robert, Stacey, "Proposed Specification Framework for TGac; 11-09, 0992-21-00ac-proposed-specification- framework for tgac", IEEE SA Mentor, 11-09-0992-21-00AC-Proposed-Specificationframework-For-TGAC, IEEE-Samentor, Piscataway, NJ USA, vol. 802.11ac, No. 21, (Dec. 9, 2009), 1-5 pgs.
Sean, Coffey, et al., "WWISE complete proposal :presentation; 11-04-0935-04-000n-wwise-complete-proposal presentation", 66 pgs.
"U.S. Appl. No. 14/341,055, Notice of Allowance dated Jul. 25, 2017", 10 pgs.
"U.S. Appl. No. 15/280,782, Examiner Interview Summary dated Jul. 26, 2017", 3 pgs.
"U.S. Appl. No. 15/280,782, Notice of Allowance dated Sep. 8, 2017", 9 pgs.
"U.S. Appl. No. 15/280,782, Response filed Aug. 11, 2017 to Non Final Office Action dated May 12, 2017", 12 pgs.
"U.S. Appl. No. 15/394,069, Examiner Interview Summary dated Jul. 28, 2017", 3 pgs.
"U.S. Appl. No. 15/394,069, Response filed Aug. 23, 2017 to Non Final Office Action dated May 26, 2017", 12 pgs.
"U.S. Appl. No. 15/263,864, Final Office Action dated Sep. 21, 2017", 19 pgs.
"U.S. Appl. No. 15/394,069, Notice of Allowance dated Sep. 22, 2017", 8 pgs.
"IEEE Standard 802.11b-1999", (1999), 1-89.
"U.S. Appl. No. 15/263,864, Response Filed Oct. 18, 2017 to Final Office Action dated Sep. 21, 2017", 11 pgs.

* cited by examiner

COMMUNICATION STATION AND METHOD FOR COMMUNICATING USING MINIMUM BANDWIDTH UNITS OF VARIOUS TONE ALLOCATIONS FOR OFDMA HEW

PRIORITY CLAIMS

This application is a U.S. National Stage Filing under 35 U.S.C. 371 from International Application No. PCT/US2014/056819, filed Sep. 22, 2014 and published in English as WO 2015/076923 on May 28, 2015, which claims the benefit of priority to the following United States Provisional Patent Applications:
Ser. No. 61/906,059 filed Nov. 19, 2013,
Ser. No. 61/973,376 filed Apr. 1, 2014,
Ser. No. 61/976,951 filed Apr. 8, 2014,
Ser. No. 61/986,256 filed Apr. 30, 2014,
Ser. No. 61/986,250 filed Apr. 30, 2014,
Ser. No. 61/991,730 filed May 12, 2014,
Ser. No. 62/013,869 filed Jun. 18, 2014, and
Ser. No. 62/024,801 filed Jul. 15, 2014,
which are all incorporated herein by reference in their entireties.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11 ac standard or the IEEE 802.11 ax SIG (named DensiFi). Some embodiments relate to high-efficiency wireless or high-efficiency WLAN (HEW) communications.

BACKGROUND

Wireless communications has been evolving toward ever increasing data rates (e.g., from IEEE 802.11a/g to IEEE 802.11n to IEEE 802.11 ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). The frame structure used for conventional and legacy IEEE 802.11 communications including very-high throughput (VHT) communications may be less suitable for such high-density deployment situations. A recently-formed study group for Wi-Fi evolution referred to as the IEEE 802.11 High Efficiency WLAN (HEW) study group (SG) (i.e., IEEE 802.11ax) is addressing these high-density deployment scenarios. One issue with HEW is defining an efficient communication structure that is able to reuse at least some 802.11ac hardware, such as a block interleaver.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications in accordance with an efficient communication structure that is able to reuse at least some conventional hardware.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments disclosed herein provide systems and methods for tone allocation in a HEW network. In some embodiments a master station may allocates tones for HEW to provide a smallest orthogonal frequency division multiple access (OFDMA) bandwidth unit (i.e., a minimum bandwidth unit). In some embodiments, an HEW communication station may be configured to communicate orthogonal-frequency division multiplexed (OFDM) symbols on channel resources that comprise one or more minimum bandwidth units. Each minimum bandwidth unit may have a predetermined bandwidth and the minimum bandwidth units may be configured in accordance with one of a plurality of subcarrier (i.e., tone) allocations for one of a plurality of interleaver configurations. In some embodiments, optimum subcarrier allocations and interleaver size combinations are provided for use with the OFDMA minimum bandwidth units. These embodiments are discussed in more detail below.

Figure 1:
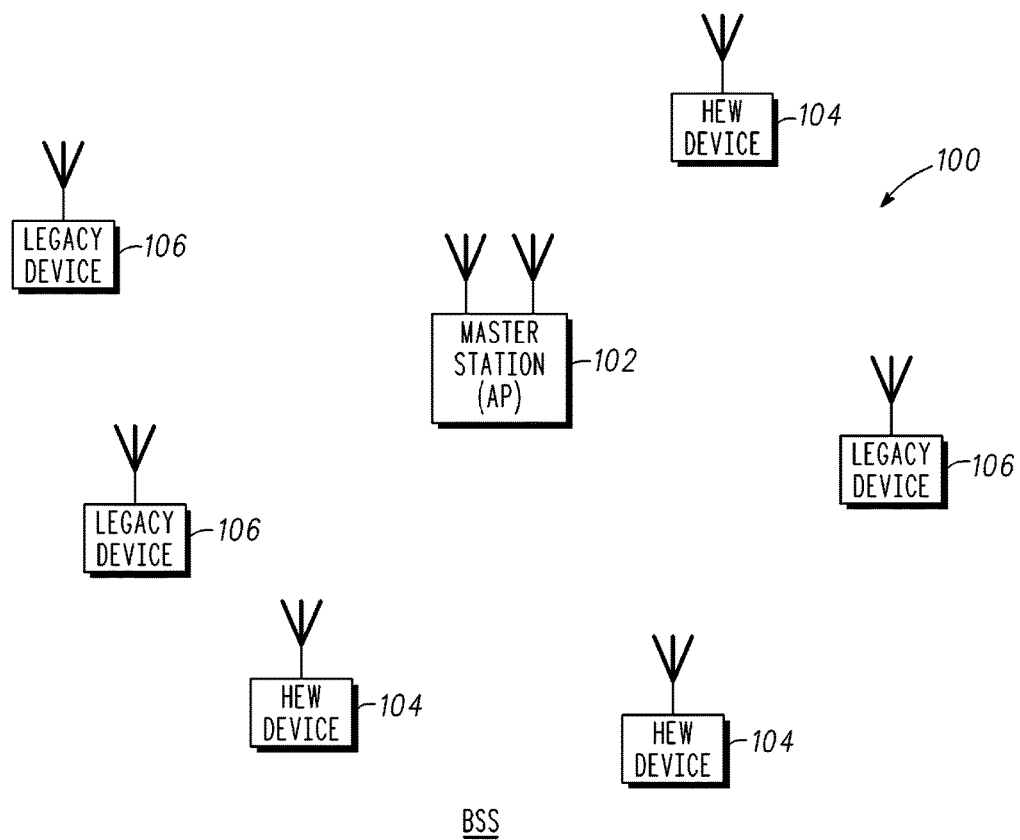
FIG. 1 illustrates a HEW network in accordance with some embodiments.

FIG. 1 illustrates a HEW network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some HEW embodiments, the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 (e.g., using one or more HEW frames). During the HEW control period, legacy stations 106 may refrain from communicating. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with legacy stations 106 in accordance with legacy IEEE 802.11 communication techniques (outside the control period). In some embodiments, the master station 102 may also be configurable communicate with the HEW stations 104 outside the HEW control period in accordance with legacy IEEE 802.11 communication techniques, although this is not a requirement.

In some embodiments, the HEW communications during the control period may be configurable to have bandwidths of one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams. HEW communications during the control period may be uplink or downlink communications.

In accordance with embodiments, an HEW communication station 104 may be configured to communicate OFDM symbols on channel resources in accordance with OFDMA technique during the control period. The channel resources may comprise one or more minimum bandwidth units and each minimum bandwidth unit may have a predetermined bandwidth. The minimum bandwidth units may be configured in accordance with one of a plurality of subcarrier allocations for one of a plurality of interleaver configurations.

In some embodiments, each of a plurality of 20 MHz channels may be configurable to include two or more minimum bandwidth units and are configurable for 20 MHz, 40 MHz, 80 MHz and 160 MHz (80+80) bandwidth operations. The subcarrier allocations for the minimum bandwidth units may comprise a predetermined number of subcarriers comprising a number of data subcarriers and a number of pilot subcarriers.

As discussed in more detail below, an HEW station 104 may comprise physical layer (PHY) and medium access control (MAC) layer circuitry. In some embodiments, the PHY circuitry may include a block interleaver having a depth of one OFDM symbol. The block interleaver may be configurable to interleave a block of encoded data in accordance with any one of the plurality of interleaver configurations. The interleaver configurations may comprise a number of columns and a number of rows.

Figure 2:
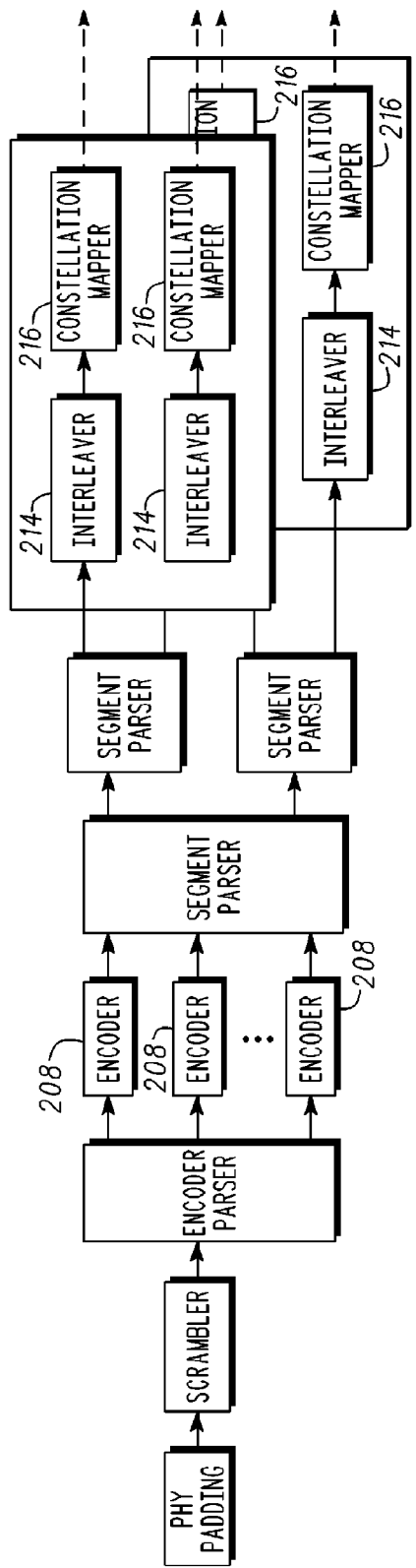
FIG. 2 is a physical-layer block diagram of an HEW communication station in accordance with some embodiments.

FIG. 2 is a physical-layer block diagram of an HEW communication station in accordance with some embodiments. As illustrated in FIG. 2, the PHY layer circuitry 200 of an HEW communication station 104 may include, among other things, one or more encoders 208, one or more block interleavers 214 and one or more constellation mappers 216. Each of the encoders 208 may be configured to encode input data prior to interleaving by the interleavers 214. Each of the constellation mappers 216 may be configured to map interleaved data to a constellation (e.g., a QAM constellation) after interleaving. Each interleaver 214 may be configured to interleave a block of encoded data in accordance with any one of the plurality of interleaver configurations. In some embodiments, the encoders 208 may be binary convolutional code (BCC) encoders.

In accordance with embodiments, the encoders 208 and mappers 216 operate in accordance with one of a plurality of predetermined modulation and coding scheme (MCS) combinations for the particular subcarrier allocation (i.e., the tone allocation). The plurality of predetermined MCS combinations for the subcarrier allocation may be restricted to an integer number of coded bits per OFDM symbol (Ncbps) and an integer number of data bits per OFDM symbol (Ndbps). In these embodiments, the number of coded bits per OFDM symbol (Ncbps) is an integer number and number of data bits per OFDM symbol (Ndbps) is an integer number. The predetermined MCS combinations and subcarrier allocations that may be used may include modulation orders of BPSK, QPSK, 16-QAM, 64-QAM and 256-QAM and coding rates of 1/2, 3/4, 2/3 and 5/6 provided that both the Ncbps and the Ndbps are integers. A non-integer Ndbps may result in a non-integer number of padding bits or the number of encoded bits exceeding the number of OFDM symbols which may lead to a minimum of one additional OFDM symbol comprised of only padding bits. An integer Ndbps may guarantee that all data lengths work with no additional padding using the 11n "Number of OFDM Symbols", equation (20-32) in 802.11 2012 spec. Thus, embodiments disclosed herein may be restricted certain MCS combinations and subcarrier allocations. In these embodiments, the interleaver hardware architecture configurations are within the boundaries of an IEEE 802.11 interleaver allowing reuse of the legacy 802.11 hardware blocks for HEW.

In these embodiments, prior to interleaving, the communication station is configured to encode the input data based on a coding rate and subsequent to the interleaving, the communication station may be configured to constellation map interleaved bits to QAM constellation points based on a modulation level. The coding rate and modulation level may be in accordance with one of the predetermined MCS combinations for the particular subcarrier allocation. These embodiments are described in more detail below.

In some embodiments, a minimum bandwidth unit may have fourteen (14) subcarriers. In these embodiments, the subcarrier allocation may comprise twelve (12) data subcarriers and two (2) pilot subcarriers and the corresponding interleaver configuration (i.e., size) may have six (6) columns (NCol) and a number of rows (Nrow) equaling two (2) (y=2) times a number of coded bits per single subcarrier (NBPSCS). In these embodiments, the block interleaver 214 may be considered a 6×2 block interleaver. In these embodiments in which the minimum bandwidth unit has 14 subcarriers, a 64-point FFT may be used for processing, although the scope of the embodiments is not limited in this respect.

In some embodiments, for a minimum bandwidth unit having fourteen (14) subcarriers, the subcarrier allocation may comprise thirteen (13) data subcarriers and one (1) pilot subcarrier and the corresponding interleaver configuration (i.e., size) may have six (6) columns (NCol) and a number of rows (Nrow) equaling two (2) (y=2) times a number of coded bits per single subcarrier (NBPSCS). In these embodiments, the block interleaver 214 may be considered a 6×2 block interleaver. In these embodiments in which the minimum bandwidth unit has 14 subcarriers, a 64-point FFT may be used for processing, although the scope of the embodiments is not limited in this respect.

In some embodiments, a minimum bandwidth unit may have twenty-eight (28) subcarriers. In these embodiments, the subcarrier allocation may comprise twenty-four (24) data subcarriers and four (4) pilot subcarriers and the corresponding interleaver configuration may have eight (8) columns (NCol) and a number of rows (Nrow) equaling three (3) (y=3) times a number of coded bits per single subcarrier (NBPSCS). In these embodiments, the block interleaver 214 may be considered an 8×3 block interleaver. In these embodiments in which the minimum bandwidth unit has 28 subcarriers, either a 128-point FFT or a 256-point FFT may be used for processing, although the scope of the embodiments is not limited in this respect.

In some embodiments, for a minimum bandwidth unit having twenty-eight (28) subcarriers, the subcarrier allocation comprises twenty-six (26) data subcarriers and two (2) pilot subcarriers and the corresponding interleaver configuration may comprise thirteen (13) columns (NCol) and a number of rows (Nrow) equaling two (2) (y=2) times a number of coded bits per single subcarrier (NBPSCS). In these embodiments, the block interleaver may be considered a 13×2 block interleaver. In these embodiments in which the minimum bandwidth unit has 28 subcarriers, either a 128-point FFT or a 256-point FFT may be used for processing, although the scope of the embodiments is not limited in this respect.

In some embodiments, a minimum bandwidth unit may have fifty-six (56) subcarriers. In these embodiments, the subcarrier allocation may comprises fifty-two (52) data subcarriers and four (4) pilot subcarriers or forty-eight (48) data subcarriers and eight (8) pilot subcarriers. In these embodiments, the corresponding interleaver configuration may comprise twenty-six (26) columns (NCol) and a number of rows (Nrow) equaling two (2) (y=2) times a number of coded bits per single subcarrier (NBPSCS), although other interleaver configurations may also be used.

In some embodiments, when a 56 subcarrier minimum bandwidth unit is processed with a (4×) 256-point FFT over a 20 MHz bandwidth, a spacing between the subcarriers is reduced by ¼ (i.e., compared to use of a 64-point FFT in 20 MHz bandwidth). Similarly, when a 28 subcarrier minimum bandwidth unit is processed with a (4×) 256-point FFT over a 20 MHz bandwidth, the spacing between the subcarriers is reduced by ¼ (i.e., compared to use of a 64-point FFT in 20 MHz bandwidth). When a 56 subcarrier minimum bandwidth unit is processed with a (2×) 128-point FFT over a 20 MHz bandwidth, a spacing between the subcarriers is reduced by ½ (i.e., compared to use of a 64-point FFT in 20 MHz bandwidth) Similarly, when a 28 subcarrier minimum bandwidth unit is processed with a (2×) 256-point FFT over a 20 MHz bandwidth, the spacing between the subcarriers is reduced by ½ (i.e., compared to use of a 64-point FFT in 20 MHz bandwidth).

In some embodiments, processing circuitry of the HEW station 104 may configure the block interleaver 214 based on one of the interleaver configurations. In some embodiments, the interleaver 214 may be configured to interleave on a per minimum bandwidth unit basis. In these embodiments, the coded bits for each a single minimum bandwidth unit may be separately interleaved. In other embodiments, the coded bits for more than one minimum bandwidth unit may be interleaved together.

In some embodiments, the interleaver 214 is configured to interleave on a 2× minimum bandwidth unit basis. In these embodiments, the coded bits for two minimum bandwidth units may be interleaved together (i.e., to provide improved performance), although the scope of the embodiments is not limited in this respect.

In some embodiments, for a minimum bandwidth unit having twenty-eight (28) subcarriers, the 28 subcarriers may be processed with 2×FFT size (i.e., a 128-point FFT instead of a 64-point FFT), although this is not a requirement as minimum bandwidth units having twenty-eight (28) subcarriers may also be processed with a 64-point FFT. In these embodiments, a longer OFDM symbol duration (4×) may be used, although this is not a requirement. These embodiments may be suitable for larger delay spread situations such as outdoor channels, although the scope of the embodiments is not limited in this respect. In some embodiments, a 128-point FFT may be used to process small size minimum bandwidth units (e.g., two 14 subcarrier minimum bandwidth units).

In some embodiments, for a minimum bandwidth unit having twenty-eight (28) subcarriers, the 28 subcarriers may be processed with 4×FFT size (i.e., a 256-point FFT instead of a 64-point FFT), although this is not a requirement as minimum bandwidth units having twenty-eight (28) subcarriers may also be processed with a 64-point FFT. In these embodiments, a longer OFDM symbol duration (4×) may be used, although this is not a requirement. These embodiments may be suitable for larger delay spread situations such as outdoor channels, although the scope of the embodiments is not limited in this respect. In some embodiments, a 256-point FFT may be used to process small size minimum bandwidth units (e.g., two 14 subcarrier minimum bandwidth units).

In some embodiments, for a minimum bandwidth unit having fifty-six (56) subcarriers, the 56 subcarriers may be processed with 4×FFT size (i.e., a 256-point FFT instead of a 64-point FFT), although this is not a requirement as a minimum bandwidth unit may also be processed with a 64-point FFT or a 128-point FFT. In these embodiments, a longer OFDM symbol duration (e.g., 4×) may be used, although this is not a requirement. These embodiments may also be suitable for larger delay spread situations such as outdoor channels, although the scope of the embodiments is not limited in this respect.

In some embodiments, each minimum bandwidth unit may be configurable for communication of between one and four spatial streams. In these embodiments, an uplink SDMA or uplink MIMO technique may be used during the control period to communicate the spatial streams. In these embodiments, a downlink SDMA or downlink MIMO technique may alternatively be used during the control period to communicate the spatial streams.

Embodiments disclosed herein provide a number of data subcarriers, number of pilot subcarriers, and the size of block interleaver for the case of binary convolutional code (BCC) coding. In some embodiments, the structure of the OFDMA waveform for 802.1 lax described in U.S. Provisional Patent Application, Ser. No. 61/976,951, may be suitable for use, although this is not a requirement. Some embodiments disclosed herein describe the minimum bandwidth unit for the OFDMA waveform and describe an architecture of the subcarrier allocation. In some embodiments, the subcarrier allocation may be configured to reuse the IEEE 802.11 ac hardware to create the new OFDMA structure. As described herein, in some embodiments a smallest unit of OFDMA of 14 subcarriers may be used. In some other embodiments, two of these units may be combined in order to create a larger minimum bandwidth unit of 28 subcarriers. In some embodiments, four 14-subcarrier minimum bandwidth units may be combined to provide a 56 subcarrier minimum bandwidth unit.

To determine the best configurations for the block interleaver based on the channel model, system simulation has been performed for MCS and other parameters. An exhaustive search within a boundary has been performed to arrive at the reasonable subcarrier allocations and preferred subcarrier allocations have been selected.

Some embodiments may reuse, to the large extent, some existing system parameters and system blocks. This makes the evolution less complicated and less expensive through the reuse of existing system blocks. Some embodiments described herein reuse the currently defined interleaver structure with extensions for the narrower bandwidth. Some embodiments described herein reuse the current code rates and provide the ability to modify the rate as needed. Some embodiments described herein reuse the current modulation types with the ability to modify the modulation size as needed. Some embodiments include the more useful subcarrier allocations under the above constraints.

Embodiments described herein outline possible allocations to each of the following groups: data subcarriers, pilot subcarriers, and the size of block interleaver. In an OFDMA system, the total number of subcarriers used in the smallest bandwidth unit may be a system design parameter. From this total subcarrier count, the OFDMA system may have subcarriers that are assigned to data, assigned to pilot (e.g., for time/frequency and channel tracking), assigned to guard (e.g., to conform to a spectral mask) and the subcarriers at DC and around DC (e.g., to simplify direct conversion receiver designs). For example, in 20 MHz IEEE 802.11ac network, the fixed subcarrier spacing is 312.5 kHz and the total number of subcarrier is 64. Of these 64 subcarriers, 52 are used for data, 1 for DC (assumed nulled), 4 for pilot and the remaining 7 are used for guard (assumed nulled).

U.S. 61/976,951, which is incorporated herein by reference, described a minimum bandwidth unit of 14 subcarriers (i.e., a smallest OFDMA bandwidth unit) for a 64-point FFT size. Two such minimum bandwidth units may be combined to provide a wider bandwidth minimum bandwidth unit with 28 subcarriers. Alternatively, a 28 subcarrier minimum bandwidth unit may be provided as the smallest OFDMA unit for 2×FFT size to help overcome larger delay spread (e.g., for an outdoor channel). The base set of modulations types may include BPSK, QPSK, 16-QAM, 64 QAM and 256 QAM.

Embodiments disclosed herein may provide subcarrier allocations based on this modulation set. Code rates utilized may be selected from the following set r={1/2, 3/4, 2/3 and 5/6}. All code rates of this set are not used for all modulation types, but this does include all current rates used over the entire modulation set. To determine the valid subcarrier allocations, the same modulation and coding assignments may be used as done in the previous systems (e.g., IEEE 802.11a/.11n/.11ac systems). As outlined above, some embodiments may utilize the existing channel interleaver from conventional IEEE 802.11 systems. The channel interleaver is defined in section 22.3.10.8 of the IEEE Std. 802.11ac-2013, "IEEE Standard for Information Technology-Telecommunications and information exchange between systems—Local and metropolitan area networks—Part 11: Wireless LAN Medium Access Control (MAC) and Physical Layer (PHY) specifications, Amendment 4: Enhancements for Very High Throughput for Operation in Bands below 6 GHz". In that text, the interleaver parameters are outlined in Table 22-17 "Number of Rows and columns in the interleaver". The table is created here for completeness, for the case of one to four spatial streams.

TABLE 22-17

Number of rows and columns in the interleaver

| Parameter | 20 MHz | 40 MHz | 80 MHz |
|---|---|---|---|
| Ncol | 13 | 18 | 26 |
| Nrow | 4 × $N_{BPSCS}$ | 6 × $N_{BPSCS}$ | 9 × $N_{BPSCS}$ |
| Nrot | 11 | 29 | 58 |

In 802.11n the introduction of 40 MHz was done reusing the existing interleaver algorithm with modifications to the matrix size defined to write and read the data. Then in 802.11ac, with the introduction of 80 MHz, again the same interleaver algorithm was utilized. These parameters define the number of coded symbols that are stored in the interleaver. Some embodiments disclosed here may reuse the existing interleaver algorithm with new values to define $N_{COL}$ and $N_{ROW}$ for an OFDMA minimum bandwidth unit. The $N_{ROT}$ operation in the above table defines a rotation of the values when more than one spatial stream exists and does not define the interleaver size and does not affect the subcarrier allocation.

Interleaver configurations in terms of $N_{COL}$ and $N_{ROW}$ may be based on system simulation. As can be seen in the table above, the $N_{Row}$ is constant times the number of coded bits per subcarrier ($N_{BPSCS}$) per stream. Thus, the interleaver physical size is a function of the MCS. Embodiments disclosed herein define the constant (y), used in computing $N_{ROW}$. The inventors have done an exhaustive search within a boundary to arrive at reasonable subcarrier allocations under the target constraints outlined above. Embodiments disclosed herein provide solutions for many interleaver structures using the above constraints.

Using the above constraints, a set of subcarrier allocations can be attained. In example embodiments that utilize a 14 data subcarrier allocation as a minimum bandwidth unit, a search was performed for anywhere from 10 to 14 subcarriers for the data subcarriers, which would then allow from 4 to 0 pilots subcarriers respectively for 4 users. In these embodiments, a minimum bandwidth unit having fourteen (14) subcarriers may allow four users to communicate simultaneously within a conventional IEEE 802.11 20 MHz communication channel that uses 56 subcarriers. In some of these embodiments, each user would communicate in accordance with an OFDMA technique using orthogonal minimum bandwidth units (i.e., with distinct sets of 14 subcarriers).

To determine if a configuration is possible based on the above constraints, a set of equations may be used. For clarity a set of variables are defined below.

| | |
|---|---|
| $N_{SD}$ | Number of Data subcarriers |
| $N_{CBPS}$ | Number of coded bits per symbol |
| $N_{BPSCS}$ | Number of coded bits per single carrier |
| $N_{DBPS}$ | Number of data bits per symbol |
| $N_{ROW}$ | Interleaver Row size, equal to y * $N_{BPSCS}$ |
| r | code rate |
| M | Modulation order (1 = BPSK, 2 = QPSK, 4 = 16-QAM, 6 = 64 QAM, 8 = 256-QAM and 10 = 1024-QAM |

With those definitions the set of procedures and equations to determine if a configuration is valid is outlined below:
1. Select the number of Data subcarriers to test ($N_{SD}$)
2. Compute $N_{CBPS} = N_{SD} * M$
3. Compute $N_{BPSCS} = N_{CBPS} * N_{SD}$ -continued 4. Compute $N_{Row} = y * N_{BPSCS}$; (where y is the assigned interleaver parameter)

5. Compute $INT_{DIM} = N_{ROW} * N_{COL}$

6. Compute $Z = \dfrac{N_{CBPS}}{INT_{DIM}}$

7. Compute $M_1 = Z - \lfloor Z \rfloor$

5. Compute $M_2 = N_{DBPS} - \lfloor N_{DBPS} \rfloor$

9. Test if $((M_1 = 0) \& (M_2 = 0))$ Then Valid, else not

Thus if $M_1$ & $M_2=0$, then a configuration using this code rate and modulation is allowable, otherwise disallowed. A script may be used to find the allowable combinations. It may be initially assumed that all modulations can be supported (e.g., as in IEEE 802.11ac for 40 MHz) including 64QAM and 256QAM (introduced in 802.11 ac) with code rate 3/4 and 5/6. Following that are other cases for 14 subcarriers. For this first assumption the allocations allowed are:

| y | NCol | Nsd |
|---|------|-----|
| 2 | 2 | 12 |
| 3 | 2 | 12 |
| 6 | 2 | 12 |
| 2 | 3 | 12 |
| 4 | 3 | 12 |
| 3 | 4 | 12 |
| 2 | 6 | 12 |

From the above search results, only 12 data subcarriers (and 2 pilot subcarriers) with the current interleaver supporting all MCSs are valid. This results with several interleaver dimensions from which to select.

Next, the same thing was done but this time the interleaver was allowed to be one-dimensional (i.e., with only a row or a column vector).

| y | NCol | Nsd |
|---|------|-----|
| 1 | 1 | 12 |
| 2 | 1 | 12 |
| 3 | 1 | 12 |
| 4 | 1 | 12 |
| 6 | 1 | 12 |
| 12 | 1 | 12 |
| 1 | 2 | 12 |
| 2 | 2 | 12 |
| 3 | 2 | 12 |
| 6 | 2 | 12 |
| 1 | 3 | 12 |
| 2 | 3 | 12 |
| 4 | 3 | 12 |
| 1 | 4 | 12 |
| 3 | 4 | 12 |
| 1 | 6 | 12 |
| 2 | 6 | 12 |
| 1 | 12 | 12 |

This search result provides more interleaver options but the 12 data subcarriers (and 2 pilots) are available (i.e., not 10, 11 or 13 data subcarriers). The above table is for completeness to determine if other subcarrier allocations are possible. Using a one-dimensional interleaver would likely perform worse than a two or 3 dimensional one.

Next, the search went back to requiring at least 2 rows and columns in the interleaver, but didn't require support of code rate 5/6 with 256-QAM (e.g., the same exclusion that is used for 20 MHz in 802.11ac). In that case the valid configuration are:

| y | NCol | Nsd |
|---|------|-----|
| 5 | 2 | 10 |
| 2 | 5 | 10 |
| 2 | 2 | 12 |
| 3 | 2 | 12 |
| 6 | 2 | 12 |
| 2 | 3 | 12 |
| 4 | 3 | 12 |
| 3 | 4 | 12 |
| 2 | 6 | 12 |
| 7 | 2 | 14 |
| 2 | 7 | 14 |

As can be seen, the same configurations results as in the first case, where there was no 256-QAM restriction, but with the addition of now having 10 and 14 subcarrier allocations possible. These embodiments allow for the use of 4 pilots (for 10 data subcarrier case) or 0 pilots (for the 14 data subcarrier case).

Finally, for completeness disallowing r=5/6 with 256-QAM, the results are outlined below. In this case both 10 and 14 data subcarrier options are again possible, with the additional one-dimensional interleaver cases.

| y | NCol | Nsd |
|---|------|-----|
| 1 | 1 | 10 |
| 2 | 1 | 10 |
| 5 | 1 | 10 |
| 10 | 1 | 10 |
| 1 | 2 | 10 |
| 5 | 2 | 10 |
| 1 | 5 | 10 |
| 2 | 5 | 10 |
| 1 | 10 | 10 |
| 1 | 1 | 12 |
| 2 | 1 | 12 |
| 3 | 1 | 12 |
| 4 | 1 | 12 |
| 6 | 1 | 12 |
| 12 | 1 | 12 |
| 1 | 2 | 12 |
| 2 | 2 | 12 |
| 3 | 2 | 12 |
| 6 | 2 | 12 |
| 1 | 3 | 12 |
| 2 | 3 | 12 |
| 4 | 3 | 12 |
| 1 | 4 | 12 |
| 3 | 4 | 12 |
| 1 | 6 | 12 |
| 2 | 6 | 12 |
| 1 | 12 | 12 |
| 1 | 1 | 14 |
| 2 | 1 | 14 |
| 7 | 1 | 14 |
| 1 | 2 | 14 |
| 7 | 2 | 14 |
| 1 | 7 | 14 |
| 2 | 7 | 14 |
| 1 | 14 | 14 |

In some embodiments that use OFDMA, two basic minimum bandwidth units may be used. These include a 14 data subcarrier minimum bandwidth unit and a 28 data subcarrier minimum bandwidth unit where two 14 minimum bandwidth units are combined. It may be more desirable to interleave across the full 28 subcarriers instead of across just 14 for this bandwidth case. Thus, the exercise above may be repeated here but in this case the subcarriers were swept from 24 to 28 data (4 to 0 pilots respectively). In this first case, we again assume all modulations can be supported as in .11ac for 80 MHz. The search also allows for one-dimensional interleavers (ignoring the spatial stream dimension), this includes 64 and 256QAM with code rate 3/4 and 5/6. With that the results are:

| y | NCol | Nsd |
|---|---|---|
| 1 | 1 | 24 |
| 2 | 1 | 24 |
| 3 | 1 | 24 |
| 4 | 1 | 24 |
| 6 | 1 | 24 |
| 8 | 1 | 24 |
| 12 | 1 | 24 |
| 24 | 1 | 24 |
| 1 | 2 | 24 |
| 2 | 2 | 24 |
| 3 | 2 | 24 |
| 4 | 2 | 24 |
| 6 | 2 | 24 |
| 12 | 2 | 24 |
| 1 | 3 | 24 |
| 2 | 3 | 24 |
| 4 | 3 | 24 |
| 8 | 3 | 24 |
| 1 | 4 | 24 |
| 2 | 4 | 24 |
| 3 | 4 | 24 |
| 6 | 4 | 24 |
| 1 | 6 | 24 |
| 2 | 6 | 24 |
| 4 | 6 | 24 |
| 1 | 8 | 24 |
| 3 | 8 | 24 |
| 1 | 12 | 24 |
| 2 | 12 | 24 |
| 1 | 24 | 24 |

As it can be seen in the above table, for this case only 24 data subcarriers are possible, requiring 4 pilot subcarriers, but there are numerous interleaver combinations.

Next, in this search it didn't require support of code rate 5/6 with 256QAM, same exclusion that is used for 20 MHz in 802.11ac. In that case the options are: (allowing one dimensional interleaver).

| y | NCol | Nsd |
|---|---|---|
| 1 | 1 | 24 |
| 2 | 1 | 24 |
| 3 | 1 | 24 |
| 4 | 1 | 24 |
| 6 | 1 | 24 |
| 8 | 1 | 24 |
| 12 | 1 | 24 |
| 24 | 1 | 24 |
| 1 | 2 | 24 |
| 2 | 2 | 24 |
| 3 | 2 | 24 |
| 4 | 2 | 24 |
| 6 | 2 | 24 |
| 12 | 2 | 24 |
| 1 | 3 | 24 |
| 2 | 3 | 24 |
| 4 | 3 | 24 |
| 8 | 3 | 24 |
| 1 | 4 | 24 |
| 2 | 4 | 24 |
| 3 | 4 | 24 |
| 6 | 4 | 24 |
| 1 | 6 | 24 |
| 2 | 6 | 24 |

-continued

| y | NCol | Nsd |
|---|---|---|
| 4 | 6 | 24 |
| 1 | 8 | 24 |
| 3 | 8 | 24 |
| 1 | 12 | 24 |
| 2 | 12 | 24 |
| 1 | 24 | 24 |
| 1 | 1 | 26 |
| 2 | 1 | 26 |
| 13 | 1 | 26 |
| 26 | 1 | 26 |
| 1 | 2 | 26 |
| 13 | 2 | 26 |
| 1 | 13 | 26 |
| 2 | 13 | 26 |
| 1 | 26 | 26 |
| 1 | 1 | 28 |
| 2 | 1 | 28 |
| 4 | 1 | 28 |
| 7 | 1 | 28 |
| 14 | 1 | 28 |
| 28 | 1 | 28 |
| 1 | 2 | 28 |
| 2 | 2 | 28 |
| 7 | 2 | 28 |
| 14 | 2 | 28 |
| 1 | 4 | 28 |
| 7 | 4 | 28 |
| 1 | 7 | 28 |
| 2 | 7 | 28 |
| 4 | 7 | 28 |
| 1 | 14 | 28 |
| 2 | 14 | 28 |
| 1 | 28 | 28 |

This allows for 24, 26 and 28 data subcarriers (4, 2 and 0 pilot subcarriers respectively).

From this it is seen that there are solutions that allow for reuse of previous versions of the standards interleaver algorithms and hardware. These solutions work for both the 14 and 28 data subcarrier OFDMA modes proposed for 802.11 ax. From this a set of preferred interleaver configurations may be selected for minimum bandwidth units of both 14 and 28 data subcarriers. For 14 subcarriers, one preferred interleaver configuration is shown below:

| y | NCol | Nsd |
|---|---|---|
| 2 | 6 | 12 |

These embodiments provide 2 pilots for receiver parameter estimation and tracking which is deemed sufficient based on past systems. Since $N_{ROW}=y*N_{BPSCS}$, and for all modulations $N_{BPSCS} \in \{1, 2, 4, 6, 8\}$, the interleaver dimension goes from a 2×6 for BPSK to a 16×6 for 256 QAM. This may provide a better solution for making the interleaver closer to square.

For a 28 subcarrier minimum bandwidth unit, some of the preferred interleaver configurations are shown below:

| y | NCol | Nsd |
|---|---|---|
| 3 | 8 | 24 |
| 2 | 13 | 26 |

In these embodiments, a 28 subcarrier minimum bandwidth unit may comprise 24 data and 4 pilot subcarriers or 26 data and 2 pilot subcarriers. Two pilots for 28 subcarriers may be sufficient, but more pilot subcarriers are also acceptable.

Some embodiments disclosed herein may be applicable to IEEE 802.11 ax and HEW networks operating with a standard OFDM symbol duration. Some other embodiments disclosed herein may be applicable to IEEE 802.1 lax and HEW networks operating with a longer OFDM symbol duration (e.g., 2× and 4× the standard symbol duration). In some embodiments, the standard-duration OFDM symbols may be selected for smaller delay-spread environments (e.g., indoors) while the longer-duration OFDM symbols are selected for larger delay spread environments (e.g., outdoors). The standard-duration OFDM symbols may have a symbol duration that ranges from 3.6 micro-seconds (us) including a 400 nanosecond (ns) short guard interval to 4 us including an 800 ns guard interval.

Figure 3:
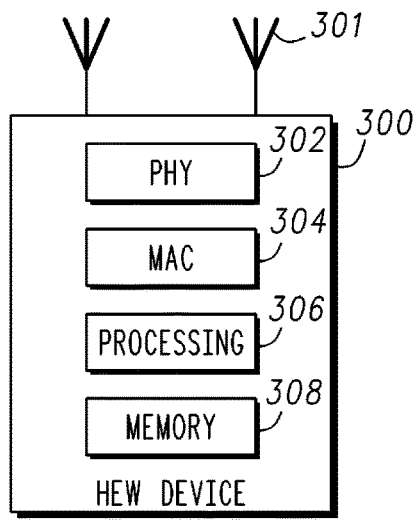
FIG. 3 illustrates an HEW device in accordance with some embodiments.

FIG. 3 illustrates an HEW device in accordance with some embodiments. HEW device 300 may be an HEW compliant device that may be arranged to communicate with one or more other HEW devices, such as HEW stations and/or a master station, as well as communicate with legacy devices. HEW device 300 may be suitable for operating as master station or an HEW station. In accordance with embodiments, HEW device 300 may include, among other things, physical layer (PHY) circuitry 302 and medium-access control layer circuitry (MAC) 304. PHY 302 and MAC 304 may be HEW compliant layers and may also be compliant with one or more legacy IEEE 802.11 standards. PHY 302 may be arranged to transmit HEW frames. HEW device 300 may also include other processing circuitry 306 and memory 308 configured to perform the various operations described herein.

In accordance with some embodiments, the MAC 304 may be arranged to contend for a wireless medium during a contention period to receive control of the medium for the HEW control period and configure an HEW frame. The PHY 302 may be arranged to transmit the HEW frame as discussed above. The PHY 302 may also be arranged to receive an HEW frame from HEW stations. MAC 304 may also be arranged to perform transmitting and receiving operations through the PHY 302. The PHY 302 may include circuitry for modulation/demodulation, upconversion/downconversion, filtering, amplification, etc. In some embodiments, the processing circuitry 306 may include one or more processors. In some embodiments, two or more antennas may be coupled to the physical layer circuitry arranged for sending and receiving signals including transmission of the HEW frame. The memory 308 may be store information for configuring the processing circuitry 306 to perform operations for configuring and transmitting HEW frames and performing the various operations described herein.

In some embodiments, the HEW device 300 may be configured to communicate using OFDM communication signals over a multicarrier communication channel. In some embodiments, HEW device 300 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 300 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 300 may include one or more of a keyboard, a display, a non-volatile memory port, multiple antennas, a graphics processor, an application processor, speakers, and other mobile device elements. The display may be an LCD screen including a touch screen.

The antennas 301 of HEW device 300 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301 may be effectively separated to take advantage of spatial diversity and the different channel characteristics that may result between each of antennas and the antennas of a transmitting station.

Although HEW device 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 300 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 4:
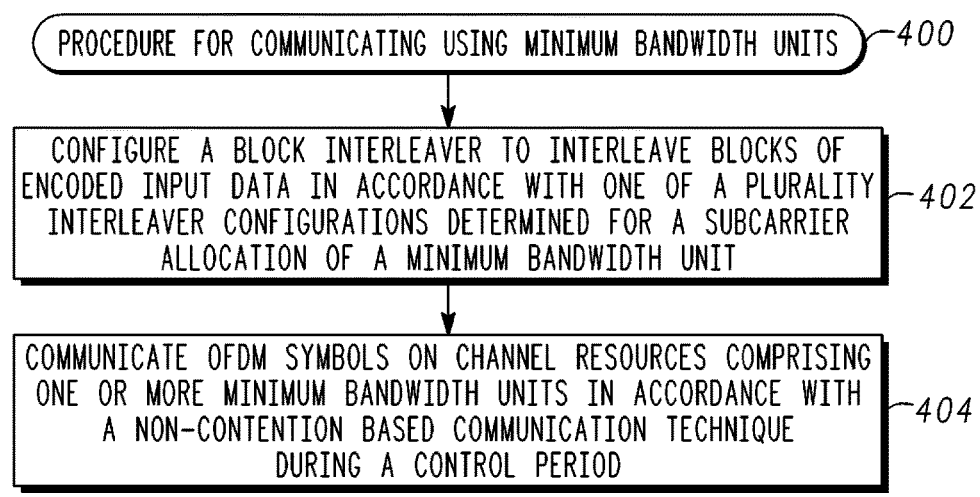
FIG. 4 is a procedure for communicating using minimum bandwidth units in accordance with some embodiments.

FIG. 4 is a procedure for communicating using minimum bandwidth units in accordance with some embodiments. Procedure 400 may be performed by an HEW device, such as HEW station 104 or an HEW master device or station 102.

Operation 402 comprises configuring a block interleaver to interleave blocks of encoded input data in accordance with one of a plurality interleaver configurations determined for a sub carrier allocation of a minimum bandwidth unit.

Operation 404 comprises communicating OFDM symbols on channel resources comprising one or more minimum bandwidth units in accordance with non-contention based communication technique during a control period.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A communication station comprising:
   medium access control (MAC) layer circuitry to receive control of channel resources for a control period, wherein during the control period, the MAC layer circuitry is configured to obtain exclusive access to the channel resources for a period of time and communicate with a plurality of stations; and
   physical layer (PHY) circuitry to communicate orthogonal frequency division multiplexed (OFDM) symbols on the channel resources in accordance with an orthogonal frequency division multiple access (OFDMA) technique during the control period, the channel resources comprising one or more minimum bandwidth units, each minimum bandwidth unit having a predetermined bandwidth,
   wherein the minimum bandwidth units are configured in accordance with one of a plurality of subcarrier allocations for one of a plurality of interleaver configurations, and wherein during the control period the PHY circuitry is configured to communicate with the stations on one or more of the minimum bandwidth units.

2. The communication station of claim 1 wherein each of a plurality of 20 MHz channels are configurable to include two or more minimum bandwidth units and are configurable for 20 MHz, 40 MHz, 80 MHz and 160 MHz bandwidth operations, and
   wherein the subcarrier allocations for the minimum bandwidth units comprise a predetermined number of subcarriers comprising a number of data subcarriers and a number of pilot subcarriers.

3. The communication station of claim 2 wherein the PHY circuitry includes a block interleaver having a depth of one OFDM symbol, the block interleaver being configurable to interleave a block of encoded data in accordance with the plurality of interleaver configurations, and
   wherein the interleaver configurations comprise a number of columns and a number of rows.

4. The communication station of claim 3, wherein the PHY circuitry further comprises:
   an encoder configured to encode input data prior to interleaving; and
   a constellation mapper to map interleaved data after the interleaving,
   wherein the encoder and mapper operate in accordance with one of a plurality of predetermined modulation and coding scheme (MCS) combinations for the subcarrier allocation,
   wherein the plurality of predetermined MCS combinations for the subcarrier allocation are restricted to an integer number of coded bits per OFDM symbol (Ncbps) and an integer number of data bits per OFDM symbol (Ndbps).

5. The communication station of claim 4 wherein for a minimum bandwidth unit having fourteen subcarriers, the subcarrier allocation comprises twelve data subcarriers and two pilot subcarriers and the interleaver configuration comprises six columns (NCol) and a number of rows (Nrow) equaling two times a number of coded bits per single subcarrier (NBPSCS).

6. The communication station of claim 4 wherein for a minimum bandwidth unit having fourteen subcarriers, the subcarrier allocation comprises thirteen data subcarriers and one pilot subcarrier and the interleaver configuration comprises six columns (NCol) and a number of rows (Nrow) equaling two times a number of coded bits per single subcarrier (NBPSCS).

7. The communication station of claim 4 wherein for a minimum bandwidth unit having twenty-eight subcarriers, the subcarrier allocation comprises twenty-four data subcarriers and four pilot subcarriers and the corresponding interleaver configuration comprises eight columns (NCol), and a number of rows (Nrow) equaling three times a number of coded bits per single subcarrier (NBPSCS).

8. The communication station of claim 4 wherein for a minimum bandwidth unit having twenty-eight subcarriers, the subcarrier allocation comprises twenty-six data subcarriers and two pilot subcarriers and the corresponding interleaver configuration comprises thirteen columns (NCol) and a number of rows (Now) equaling two times a number of coded bits per single subcarrier (NBPSCS).

9. The communication station of claim 4 wherein for a minimum bandwidth unit having fifty-six subcarriers: the subcarrier allocation comprises one of:
   fifty-two data subcarriers and four pilot subcarriers; and
   forty-eight data subcarriers and eight pilot subcarriers.

10. The communication station of claim 4 wherein the interleaver is configured by processing circuitry to interleave the encoded input data on a per minimum bandwidth unit basis.

11. The communication station of claim 4 wherein the interleaver is configured by processing circuitry to interleave the encoded input data on a 2× minimum bandwidth unit basis.

12. The communication station of claim 4, wherein for a minimum bandwidth unit having twenty-eight subcarriers, the twenty-eight subcarriers are processed with 2×FFT size.

13. The communication station of claim 4, wherein for a minimum bandwidth unit having twenty-eight subcarriers, the twenty-eight subcarriers are processed with 4×FFT size.

14. The communication station of claim 4, wherein for a minimum bandwidth unit having fifty-six subcarriers, the fifty-six subcarriers are processed with 4×FFT size.

15. The communication station of claim 14 wherein when the subcarriers of a minimum bandwidth unit are processed with a 4×FFT size, a spacing between the subcarriers is reduced by ¼, and
   wherein when the subcarriers of a minimum bandwidth unit are processed with a 2×FFT size, a spacing between the subcarriers is reduced by ½.

16. The communication station of claim 1 wherein the communication station is a high-efficiency WLAN (HEW) access point configured to operate as a master station and configured to:
   contend for a wireless medium during a contention period to receive control of the medium for the control period; and
   communicate the OFDM symbols with scheduled HEW devices during the control period, wherein during the control period, the master station has exclusive use of the wireless medium for communication with the scheduled HEW stations in accordance with the OFDMA technique.

17. The communication station of claim 1 wherein the communication station is a high-efficiency WLAN (HEW) device configured to communicate with an HEW master station during the control period.

18. A method for communicating in an IEEE 802.11 network by a communication station, the method comprising:
   receiving control of channel resources for a control period and obtaining, during the control period, exclusive access to the channel resources for a period of time to communicate with a plurality of stations, the channel resources comprising one or more minimum bandwidth units, each minimum bandwidth unit having a predetermined bandwidth; and
   communicating, with the stations, orthogonal frequency division multiplexed (OFDM) symbols on one or more of the minimum bandwidth units in accordance with an orthogonal frequency division multiple access (OFDMA) technique during the control period,
   wherein the minimum bandwidth units are configured in accordance with one of a plurality of subcarrier allocations for one of a plurality of interleaver configurations.

19. The method of claim 18 wherein each of a plurality of 20 MHz channels are configurable to include two or more minimum bandwidth units and are configurable for 20 MHz, 40 MHz, 80 MHz and 160 MHz bandwidth operations, and
   wherein the subcarrier allocations for the minimum bandwidth units comprise a predetermined number of subcarriers comprising a number of data subcarriers and a number of pilot subcarriers, and
   wherein the method further comprises configuring a block interleaver to interleave blocks of encoded input data in accordance with one of the interleaver configurations.

20. The method of claim 19 wherein the interleaver configurations comprise a number of columns and a number of rows, and
   wherein the method further comprises:
   encoding input data prior to interleaving; and
   mapping interleaved data after the interleaving,
   wherein the encoding and mapping operate in accordance with one of a plurality of predetermined modulation and coding scheme (MCS) combinations for the subcarrier allocation,
   wherein the plurality of predetermined MCS combinations for the subcarrier allocation are restricted to an integer number of coded bits per OFDM symbol (Ncbps) and an integer number of data bits per OFDM symbol (Ndbps).

21. A non-transitory computer-readable storage medium that stores instructions for execution by one or more processors to perform operations to configure a communication station to:
   receive control of channel resources for a control period, wherein during the control period, the communication station is configured to obtain exclusive access to the channel resources for a period of time and communicate with a plurality of stations; and
   communicate orthogonal frequency division multiplexed (OFDM) symbols on the channel resources in accordance with an orthogonal frequency division multiple access (OFDMA) technique during the control period, the channel resources comprising one or more minimum bandwidth units, each minimum bandwidth unit having a predetermined bandwidth,
   wherein the minimum bandwidth units are configured in accordance with one of a plurality of subcarrier allocations for one of a plurality of interleaver configurations, and wherein during the control period the communication station is configured to communicate with the stations on one or more of the minimum bandwidth units.

22. The non-transitory computer-readable storage medium of claim 21
   wherein the subcarrier allocations for the minimum bandwidth units comprise a predetermined number of subcarriers comprising a number of data subcarriers and a number of pilot subcarriers, and
   wherein a plurality of predetermined modulation and coding scheme (MCS) combinations for the subcarrier allocation are restricted to an integer number of coded bits per OFDM symbol (Ncbps) and an integer number of data bits per OFDM symbol (Ndps).

* * * * *

UNITED STATES PATENT AND TRADEMARK OFFICE
CERTIFICATE OF CORRECTION

PATENT NO. : 9,838,961 B2  
APPLICATION NO. : 15/023581  
DATED : December 5, 2017  
INVENTOR(S) : Kenney et al.

Page 1 of 1

It is certified that error appears in the above-identified patent and that said Letters Patent is hereby corrected as shown below:

On the Title Page

On page 2, in Column 1, under "Related U.S. Application Data", Line 3, delete "Apr. 3," and insert --Apr. 30,-- therefor On page 3, in Column 1, under "Other Publications", Line 11, delete "Jul. 25," and insert --May 9,-- therefor On page 3, in Column 1, under "Other Publications", Line 16, delete "Feb. 2," and insert --Feb. 26,-- therefor On page 4, in Column 1, under "Other Publications", Line 10, delete "High-Feficiency" and insert --High-Efficiency-- therefor In the Claims In Column 16, Line 26, in Claim 8, delete "(Now)" and insert --(Nrow)-- therefor In Column 18, Line 42, in Claim 22, delete "(Ndps)." and insert --(Ndbps).-- therefor Signed and Sealed this  
Nineteenth Day of May, 2020

Andrei Iancu  
*Director of the United States Patent and Trademark Office*